United States Patent [19]
Douglas

[11] 3,877,042
[45] Apr. 8, 1975

[54] PROCESSING SYSTEM FOR PHOTOGRAPHIC APPARATUS

[75] Inventor: Lawrence M. Douglas, South Easton, Mass.

[73] Assignee: Polaroid Corporation, Cambridge, Mass.

[22] Filed: Dec. 26, 1973

[21] Appl. No.: 427,581

[52] U.S. Cl. .................... 354/86; 100/173; 354/304
[51] Int. Cl. ........................................... G03b 17/50
[58] Field of Search ........ 354/86, 304, 84; 100/173, 100/176, 155 R

[56] References Cited
UNITED STATES PATENTS

| | | | |
|---|---|---|---|
| 2,759,404 | 8/1956 | Bishop et al. | 354/86 |
| 3,382,788 | 5/1968 | Eloranta | 354/304 |
| 3,604,329 | 9/1971 | Land | 354/304 X |
| 3,691,920 | 1/1971 | Harvey | 354/86 |
| 3,779,143 | 12/1973 | Harvey | 354/86 |

*Primary Examiner*—Richard L. Moses
*Attorney, Agent, or Firm*—Alfred E. Corrigan

[57] ABSTRACT

Photographic apparatus including a pair of rollers between which an exposed film unit is adapted to be advanced. The rollers include sheet-contacting surfaces which are adapted to rupture a container of processing composition located near one end of the film unit and spread the contents thereof across a photosensitive layer of the film unit to initiate formation of a visible image while simultaneously advancing the film unit away from its exposure position. The driving force which the rollers apply to the film unit is enhanced by gearing the rollers to each other for simultaneous rotation and by providing the ends of the rollers with surfaces having a greater coefficient of friction than the sheet-contacting surfaces. These ends are adapted to engage and apply a greater driving force to laterally spaced borders of the film unit than the sheet-contacting surfaces of the rollers apply to the remainder of the film unit.

8 Claims, 5 Drawing Figures

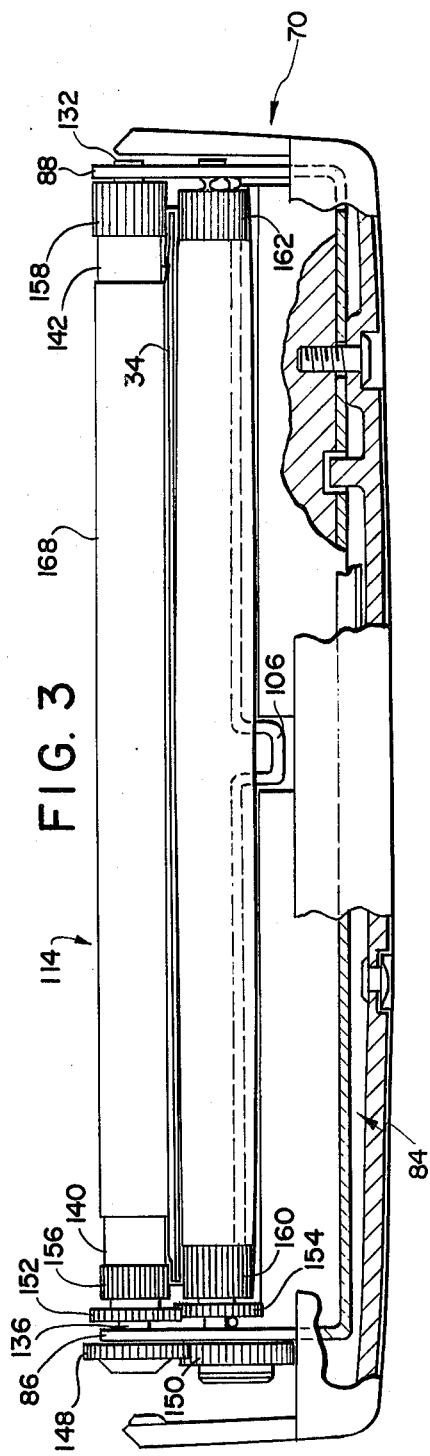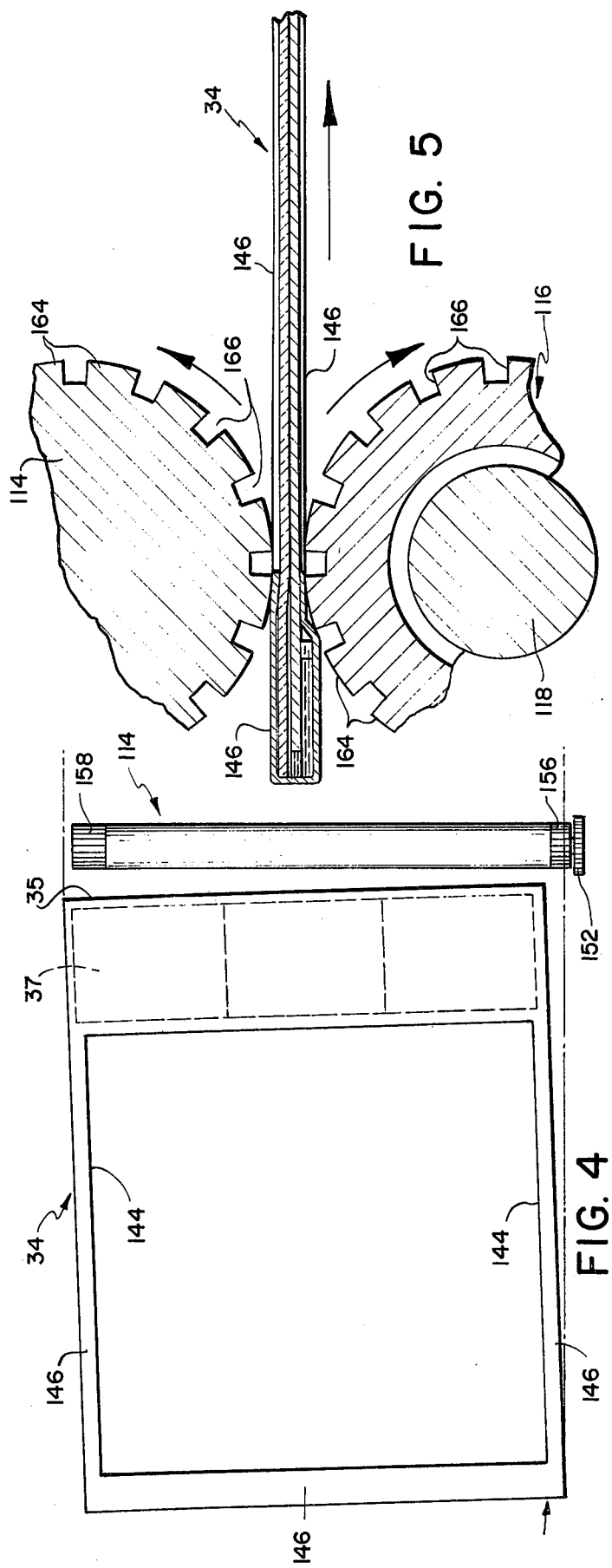

PROCESSING SYSTEM FOR PHOTOGRAPHIC APPARATUS

BACKGROUND OF THE INVENTION

1. Field of the Invention

This invention relates to photographic apparatus for spreading a processing composition across a photosensitive element of a film unit to initiate formation of a visible image.

2. Description of the Prior Art

Photographic apparatus for spreading a processing composition, e.g., a liquid, across a photosensitive element to initiate formation of a visible image by a diffusion type process as well known in the art. Generally, they take the form of a pair of pressure-applying members which are mounted in juxtaposition to define a pressure generating gap. An exposed film unit is advanced through the gap while the pressure-applying members spread the processing composition across the photosensitive element of the film unit in a layer of predetermined thickness. In some instances, the film is provided with a tab by which the film may be manually drawn through the pressure-applying members as shown by U.S. Pat. No. 3,615,436, or by using a pair of rollers for advancing the film through the pressure-applying members, as shown in U.S. Pat. No. 2,458,186. However, a problem arises when the pressure-applying members are a pair of rollers and there is no leader or tab by which the film may be advanced through the rollers, i.e., the rollers must be capable of advancing the film unit at a substantially constant speed during spreading of the processing composition. Should the rollers fail to maintain this constant speed, e.g., the surface of the rotating rollers slip relative to the film unit, the thickness of the layer of processing composition may be other than that desired, thereby adversely affecting the quality of the visible image. Several means have been proposed for overcoming this problem. For example, the above-noted U.S. Pat. No. 2,458,186 provides a camera with a set of advancing rollers having a high coefficient of friction (rubber, knurled, etc.) for advancing a section of a roll of film through a pair of pressure-applying rollers. Also, reference may be made to U.S. Pat. No. 3,766,842 which discloses a roller having a coating of urethane thereon for increasing its coefficient of friction. However, each of these proposals has its drawbacks in that the former requires two sets of rollers while the latter involves a relatively expensive coating and grinding process. Accordingly, it can be seen that there is a need for an inexpensive, highly reliable roller spread system which is capable of advancing an exposed film unit at a substantially constant speed while simultaneously spreading a processing composition across a photosensitive layer thereof in a layer of predetermined thickness.

SUMMARY OF THE INVENTION

The instant invention relates to improved photographic apparatus for spreading a processing composition across an exposed photosensitive layer to initiate formation of a visible image. More particularly, the photographic apparatus takes the form of a pair of pressure-applying rollers between which an exposed film unit is adapted to be advanced. The rollers include sheet-engaging surfaces which are adapted to rupture a container a processing liquid, preferably located near a leading edge of the exposed film unit, and spread the contents thereof across the photosensitive layer of the film unit while simultaneously advancing the exposed film unit away from its exposure position. The efficiency with which the rollers advance the exposed film unit is enhanced by gearing the rollers to each other for simultaneous rotation and by providing the ends of at least one of the rollers with surfaces having a greater coefficiency of friction than its sheet-contacting surface. These end surfaces are adapted to engage laterally spaced borders of the exposed film unit, much like the tread of a snow tire contacts the snow, to apply a greater driving force to the borders of the film unit than the sheet-contacting surface of the roller applies to the remainder of the film unit.

The spread roller assembly of the instant invention is especially adapted for use in a camera of the type wherein the exposed film unit may enter the bite of the rollers in a canted condition, e.g., the longitudinal axis of the film unit is not perpendicular to a plane containing the axes of the rollers. In this environment, the gears coupling the rollers to each other for simultaneous rotation are mounted on the ends of the rollers which are first engaged by the canted leading edge of the film unit, thereby insuring that no part of the film unit will pass through the gears regardless of the canting of the film unit.

An object of the invention is to provide an inexpensive, highly reliable spread roller system for advancing an exposed film unit at a substantially constant speed while simultaneously spreading a processing composition across a photosensitive layer of the film unit.

Another object of the invention is to provide a pair of spread rollers wherein at least one of the rollers has opposite end surfaces having a greater coefficiency of friction than intermediate surface portions of the roller.

Still another object of the invention is to provide a pair of geared spread rollers for use in a camera where an exposed film unit may be canted as it engages the rollers wherein the gears are mounted on the ends of the rollers which are first engaged by the canted leading edge of the film unit.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 3 is an end elevation, partly in section, of the spread roller assembly;

FIG. 4 is a plan view of an exposed film unit as it is about to engage the spread roller assembly in a canted orientation; and FIG. 5 is an enlarged section through the rollers of the spread roller assembly.

DETAILED DESCRIPTION OF THE INVENTION

Figure 1:
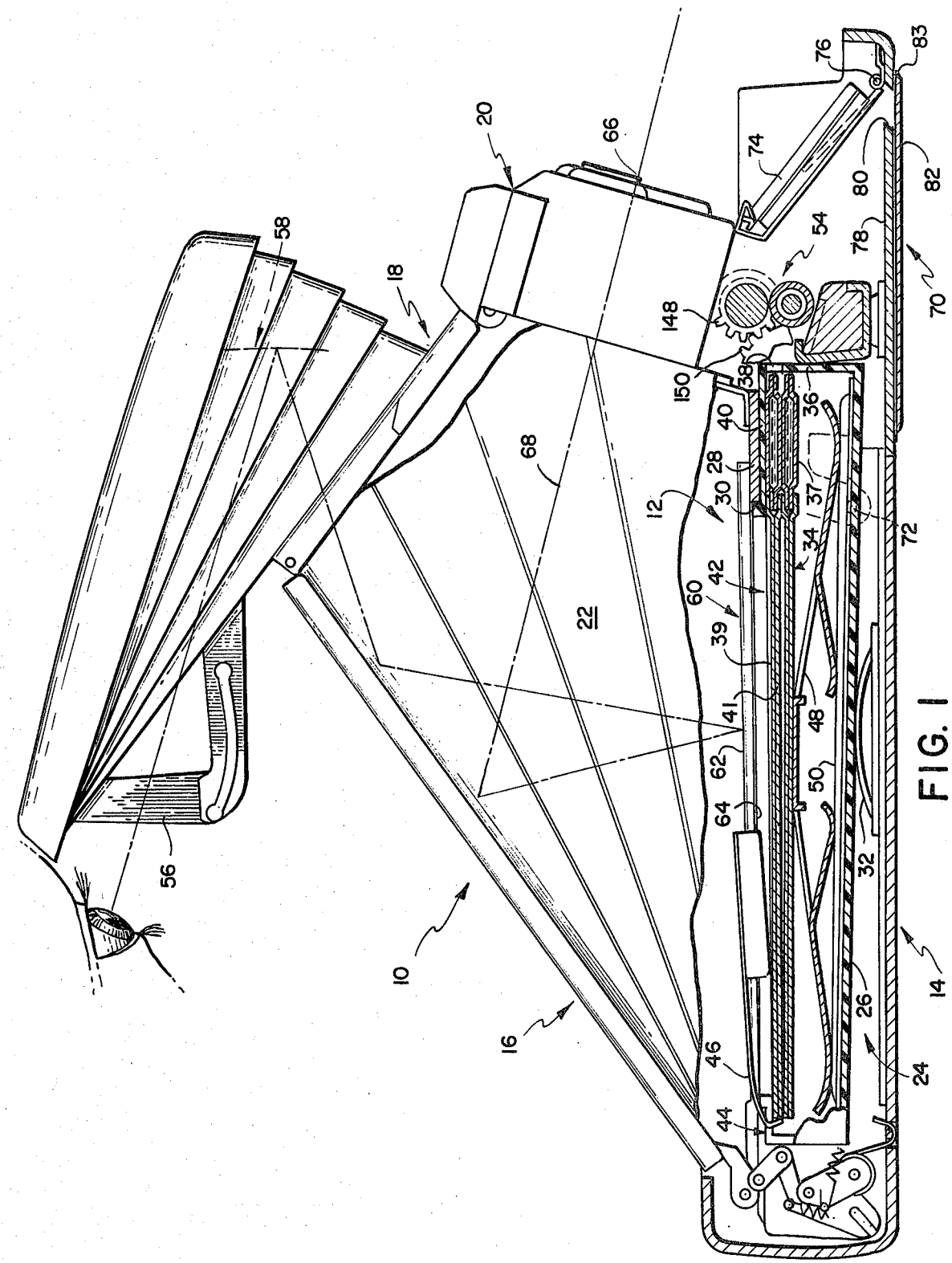
FIG. 1 is a side elevation, partly in section, of a camera and spread roll assembly embodying the instant invention.

Reference is now made to FIG. 1 of the drawings wherein is shown photographic apparatus in the form of a self-developing type camera 10. Camera 10 includes an exposure chamber 12 defined by a plurality of housing sections 14, 16, 18, 20 and a flexible bellows 22. Housing section 14 includes a chamber 24 for receiving a film cassette 26, and means including a wall 28 having an exposure aperture 30 therein and a spring 32 for locating the foremost film unit 34 within the cassette 26 in position for exposure.

Film cassette 26 preferably includes a leading end wall 36 having a slot 38 therein, a forward wall 40 having an exposure opening 42 and an opening 44 adjacent one corner thereof through which film engaging means 46 may extend to engage (as indicated by the arrow in FIG. 4) the foremost film unit and advance it away from its exposure position via slot 38. A platen 48 is positioned between the rearmost film unit 34 and a battery 50 for resiliently urging a film unit into position for exposure and the battery 50 against a rear wall 52 of the cassette where its terminals may be engaged by the contacts of an electrical circuit (not shown) for providing the energy to drive various instrumentalities of the camera, e.g., a spread roller system shown at 54.

The camera includes a single lens reflex viewing system comprising an eye lens 56, a concave mirror shown diagrammatically at 58, a reflecting surface (not shown) secured to an interior surface of housing section 16 and a reflex member 60 having a viewing surface 62 mounted on one side thereof and a reflecting surface 64, e.g., a mirror mounted on its opposite side. The reflex member 60 is pivotally mounted for movement between a viewing position, as shown in FIG. 1, wherein it prevents passage of light through exposure apertures 30 and 42 and an exposure position wherein it is pivoted upwardly to a position closely adjacent the reflecting surface (not shown) on the interior surface of the housing section 16. When the reflex member 60 is in the viewing position, light passes through a lens and shutter assembly 66 in housing section 20 and generally follows a path denoted 68. After the image has been focused, a normally open switch is manually closed to initiate an exposure cycle, as is more fully described in U.S. Pat. No. 3,744,385, granted to J. Burgarella et al. on July 10, 1973, and assigned in common herewith.

A spread roller housing 70 is pivotally mounted at 72 to housing section 14 for movement between the position shown in FIG. 1 wherein the spread roller assembly 54 is in closing relation to one end of chamber 24, and a film cassette loading position wherein the housing 70 and roller assembly 54 have been rotated approximately 90° in a clockwise manner. A light shield 74 is pivotally mounted at 76 to a bottom wall 78 of housing section 70. Wall 78 is provided with an opening 80 through which a film unit is adapted to exit from the camera. A resilient light seal 82 having a cantilevered end 83 is mounted in light sealing engagement with opening 80. In operation, the leading end of the exposed film unit is adapted to be advanced by the spread roller assembly 54 into engagement with light seal 74 which in turn deflects the leading edge of the film unit towards the opening 80. When the trailing edge (to the left as viewed in FIG. 1) of the film unit moves out of engagement with the spread roller assembly, light shield 82 functions to frictionally hold the film unit intermediate its ends until it is manually detached from the camera.

Figure 2:
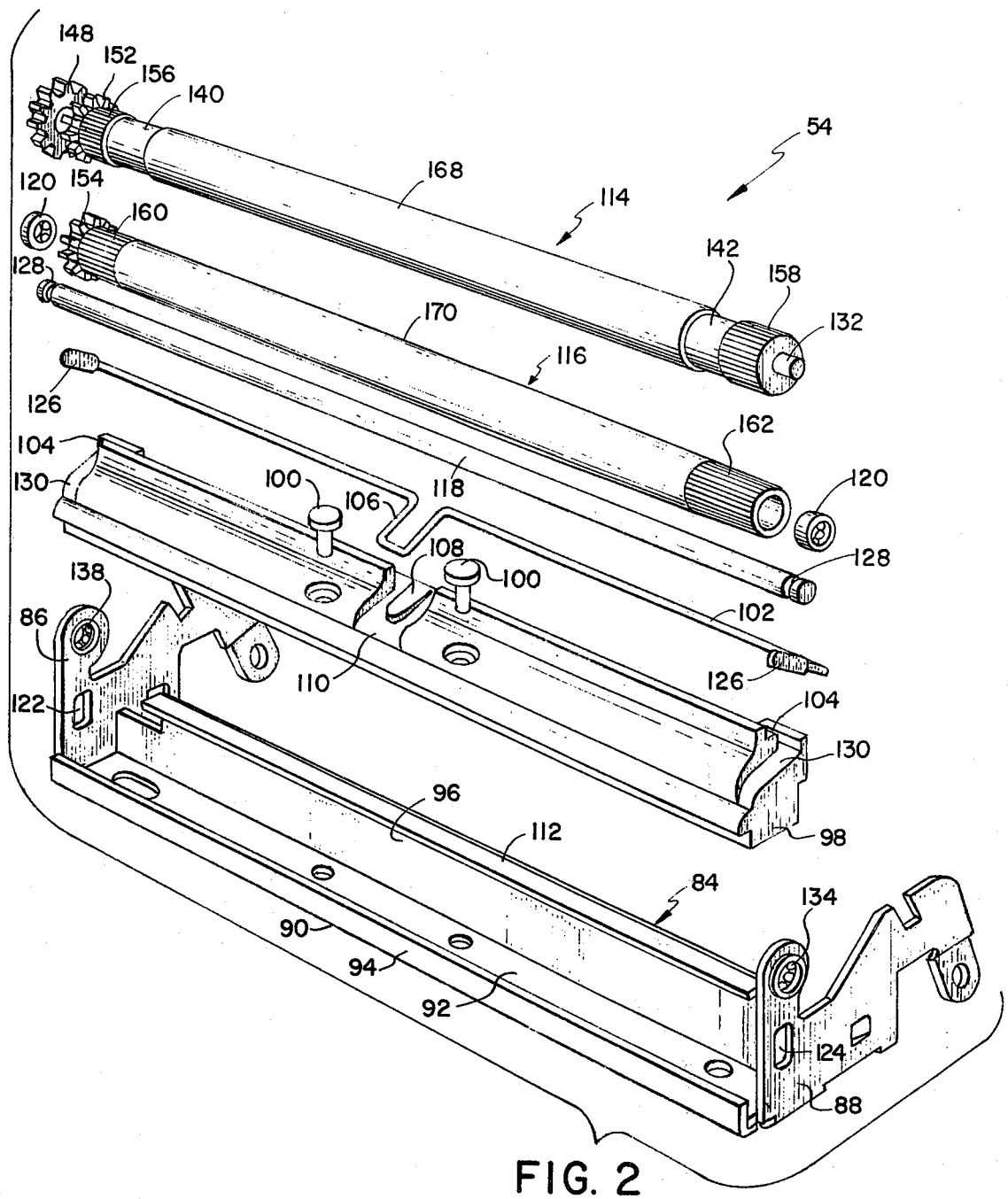
FIG. 2 is an exploded diagrammatic view in perspective of the spread roller assembly shown in FIG. 1.

As indicated, the present invention is particularly directed to certain aspects of the camera's spread roller assembly 54, the nature of which may best be understood by referring to FIG. 2 of the drawings. As shown therein, the assembly 54 comprises a spread roller bracket 84 having a pair of ears 86 and 88 joined together by a central portion 90 comprising a support 92 and spaced substantially parallel flange portions 94 and 96. A rigid structural support member 98 is configured to seat against the support 92 intermediate the ears 86 and 88 and nested between the flange portions 94 and 96. A pair of rivets 100 serve to secure the support member 98 to the bracket 84. A specially configured torsion spring 102 rests in tracks 104 of the support member 98 with a generally U-shaped portion 106 thereof extending around a lip 108 formed on the support member and seated against a supporting surface 110 of that member. When the spring 102 is positioned on support member 98 and the latter is connected to the bracket 84 as indicated, an elongated projection 112 depending from flange 96 serves to retain the spring in position on the support member. In this manner, the spring 102 is unexposed, i.e., it is retained within the confines of the bracket 84.

Spread roller assembly 54 further includes a pair of rollers 114 and 116 preferably formed from stainless steel. Roller 116 is hollow and therefore relatively light in weight and of low inertia, being rotatably mounted on a shaft 118 by a pair of ball bearing assemblies 120. Respective ends of the shaft 118 extend through elongated slots 122 and 124 provided in the ears 86 and 88 of bracket 84. It should be noted that the length of the slots 122 and 124 determine the spacing between the rollers 114 and 116 and are preferably of a length that will provide a gap of a predetermined thickness, e.g., 0.007 of an inch, between the rollers to facilitate introduction of the leading edge of an exposed film unit. Flattened ends 126 of spring 102 seat in appropriately positioned annular recesses 128 of the shaft 118 so that the force of the spring continually urges the roller 116 towards its uppermost position within the slots 122 and 124. Support member 98 is configured with a pair of cutouts 130 to accommodate initial loading of the spring 102 and subsequent displacement of its flattened ends 126 responsive to translatory movement of the shaft 118 along the slots 122 and 124. As can be seen in FIG. 2, roller 116 preferably has a substantially "candlepin" configuration, i.e., it tapers from a maximum diameter at substantially its midpoint to smaller common diameters equally spaced from said midpoint. However, it is within the scope of the invention to provide roller 116 with a substantially cylindrical configuration.

Roller 114, which is preferably cylindrical, is provided on one end thereof with an extension 132 which is adapted to be journaled to ear 88 by a ball bearing assembly 134, and on its other end with an extension 136 (see FIG. 3) which is adapted to be journaled to ear 86 by ball bearing assembly 138. Preferably, roller 114 is provided with a pair of laterally spaced annular recesses 140 and 142 strategically positioned to receive the inwardly facing end portions 144 of the laterally spaced sections of edge binding 146 of the film unit 34 in order to preclude the "red-framing" effect in accordance with the teachings of U.S. Pat. No. 3,647,441. A gear 148 is fixedly mounted on a reduced end section of extension 132. Gear 148 is in mesh with a gear 150 which is part of a gear train (not shown) provided for driving roller 114, as is more fully described in U.S. Pat. No. 3,753,392, granted to Edwin H. Land on Aug. 21, 1973 and assigned in common herewith.

Operation of the apparatus as thus far defined will not be described. After the subject has been properly focused, the camera's exposure initiation button (not shown) is depressed to close the aforementioned normally open switch to start the exposure cycle. After the foremost film unit 34 has been exposed, film engaging member 46 is actuated by the aforementioned gear train to move the leading edge 35 of the film unit into engagement with the rollers 114 and 116. When the film unit is in engagement with the rollers, rotation of roller 114 via the gear train is transferred to roller 116 via the film unit. Rollers 114 and 116 then advance the exposed film unit out of its exposure position while simultaneously rupturing a container of processing composition 37 and spreading its contents between sheets 39 and 41 and across a photosensitive layer which preferably forms part of one of the sheets to initiate formation of the visible image in the area bounded by edge binding 146. The film unit then exits from the camera via opening 80 as described hereinbefore. As is well known in the art, the quality of the visible image is dependent upon, among other things, the thickness of the layer of processing composition spread by the rollers. If, for any reason, the rollers fail to advance the exposed film unit at a substantially constant speed, e.g., one or both rollers slip on the surface of the film unit thereby resulting in a decrease in the speed of advancement of the film unit, the thickness of the layer of processing composition may also change thereby affecting the quality of the visible image. This problem has been substantially obviated firstly by providing one end of roller 114 with a gear 152 and the corresponding end of roller 116 with a gear 154 for imparting simultaneous rotation to the rollers, and secondly by providing laterally spaced sections of the rollers with surfaces having a greater coefficient of friction than the sheet-contacting surfaces of the rollers. Specifically, the ends 156 and 158 of roller 114 and ends 160 and 162 of roller 116 are splined to provide a plurality of peaks 164 and valleys 166, as best seen in FIGS. 3 and 5. These splined surfaces are adapted to engage the laterally spaced longitudinally extending sections of edge binding 146 of the film unit in a manner similar to that of the treads of a snow tire engaging snow. The splined surfaces apply a greater driving force to these sections of the edge binding 146 than the sheet-contacting surfaces, i.e., surface 168 of roller 114 which extends between recesses 140 and 142 and surface 170 which extends between splined ends 160 and 162 of roller 116, apply to the sheets 39 and 41 of the film unit. It has been found that mounting the rollers such that corresponding peaks 164 of the rollers rotate pass a given point at the same time, as shown in FIG. 5, increases the efficiency of the rollers in advancing the film unit at a substantially constant speed.

The spread roller assembly 54 is especially adapted for use in a camera of the type disclosed wherein the exposed film unit may be slightly canted, as shown in FIG. 4, as it is about to enter into engagement with the rollers 114 and 116. This canting of the film unit is usually the result of the film advancing member 46 engaging the film unit near its lower left hand corner, as indicated by the arrow in FIG. 4, and rotating it about 1° in a counterclockwise direction. To preclude the top right hand corner of the film unit from passing outboard of the splined ends and through the gears on the rollers 114 and 116, the gears are mounted adjacent that end of the rollers which will be engaged by the leading edge 35 of the film unit before the time that the opposite end of the rollers is engaged by the film unit's leading edge.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for spreading a processing fluid in a layer between a pair of elements, at least one of which forms part of a discrete film unit, said apparatus comprising:

a first roller having an elongated sheet-contacting surface;

a second roller having an elongated sheet-contacting surface;

means for mounting said first and second rollers with said sheet-contacting surfaces disposed in juxtaposition;

drive means coupled to said first and second rollers for driving said rollers simultaneously; and both of said rollers further including means adjacent opposite ends thereof having a greater coefficient of friction than said sheet-containing surfaces for engaging and applying a greater driving force to lateral edges of the film unit than said sheetcontacting surfaces apply to the film unit during spreading of the processing fluid by said first and second rollers, said means having a greater coefficient of friction than said sheet-contacting surfaces comprising a plurality of peaks and valleys, and wherein said first and second rollers are mounted to position said peaks of said first roller in synchronization with said peaks of said second roller such that corresponding peaks of said first and second rollers are rotated past a given point at the same time.

2. Photographic apparatus for use with a discrete film unit having leading and trailing edges interconnected by spaced edges and a container of processing composition located adjacent the leading edge which is adapted to be ruptured prior to spreading the processing composition across a photosensitive layer of the film unit and toward the trailing edge, comprising:

means for locating the film unit in position for exposure;

means for engaging and applying a canting movement to the film unit as it is advanced out of the exposure position subsequent to exposure;

pressure-applying means including first and second rollers having sheet-contacting surfaces mounted in position to receive the film unit therebetween for rupturing the container and spreading the processing composition across the photosensitive layer, each of said first and second rollers including a first end portion adapted to be engaged by a portion of the leading edge of the exposed film unit before or at the time that an opposite second end portion of each of said first and second rollers is adapted to be engaged by the leading edge of the exposed film unit; and drive means coupled to said first and second rollers adjacent said first end portion thereof for imparting simultaneous rotation thereto.

3. Photographic apparatus as defined in claim 2 wherein at least one of said first and second rollers further include means adjacent said first and second end portions having a greater coefficient of friction than said sheet-contacting surface for engaging and applying a greater driving force to the spaced edges of the film unit than said sheet-contacting surface applies to the film unit during spreading of the processing composition by said first and second rollers.

4. Photographic apparatus as defined in claim 3 wherein said means defining a greater coefficient of friction comprise a plurality of peaks and valleys.

5. Photographic apparatus as defined in claim 2 wherein both of said first and second rollers include means adjacent opposite ends thereof having a greater coefficiency of friction than said sheet-contacting surfaces.

6. Photographic apparatus as defined in claim 5 wherein said means having a greater coefficiency of friction comprises a plurality of peaks and valleys.

7. Photographic apparatus as defined in claim 6 wherein said first and second rollers are mounted to position said peaks of said first roller in synchronization with said peaks of said second roller such that corresponding peaks of said first and second rollers are rotated past a given point at the same time.

8. Photographic apparatus as defined in claim 7 wherein said peaks and valleys comprise a plurality of splines.

* * * * *